(12) United States Patent
Walker et al.

(10) Patent No.: US 12,235,776 B2
(45) Date of Patent: Feb. 25, 2025

(54) SENSOR AND SENSOR NETWORK

(71) Applicant: Robert Bosch GmbH, Stuttgart (DE)

(72) Inventors: Steffen Walker, Reutlingen (DE); Ricardo Erckert, Bad Aibling (DE)

(73) Assignee: ROBERT BOSCH GMBH, Stuttgart (DE)

( * ) Notice: Subject to any disclaimer, the term of this patent is extended or adjusted under 35 U.S.C. 154(b) by 259 days.

(21) Appl. No.: 17/798,149

(22) PCT Filed: Aug. 5, 2021

(86) PCT No.: PCT/DE2021/100674
§ 371 (c)(1),
(2) Date: Aug. 8, 2022

(87) PCT Pub. No.: WO2022/028656
PCT Pub. Date: Feb. 10, 2022

(65) Prior Publication Data
US 2023/0102989 A1  Mar. 30, 2023

(30) Foreign Application Priority Data
Aug. 5, 2020 (DE) .................... 10 2020 209 879.4

(51) Int. Cl.
*G06F 13/10* (2006.01)
(52) U.S. Cl.
CPC .......... *G06F 13/10* (2013.01); *G06F 2213/40* (2013.01)
(58) Field of Classification Search
CPC .. G06F 13/10; G06F 2213/40; G06F 13/4256; G06F 13/4273; G06F 13/4291; G06F 13/4068
See application file for complete search history.

(56) References Cited

U.S. PATENT DOCUMENTS

2008/0094210 A1* 4/2008 Paradiso ............. H04L 12/2827
340/540
2014/0365702 A1* 12/2014 Ray .................... G06F 13/4068
710/305

FOREIGN PATENT DOCUMENTS

| DE | 102014107689 A1 | 12/2014 |
| DE | 102014113162 A1 | 3/2016 |
| DE | 102016101738 A1 | 8/2016 |

OTHER PUBLICATIONS

International Search Report for PCT/DE2021/100674, Issued Nov. 25, 2021.

(Continued)

*Primary Examiner* — Mi'schita' Henson
(74) *Attorney, Agent, or Firm* — NORTON ROSE FULBRIGHT US LLP; Gerard A. Messina

(57) ABSTRACT

A sensor and a sensor network. The sensor comprises a switchable RC low-pass filter, an evaluation unit, a synchronization unit, and a two-wire interface. The two-wire interface is configured to be connected to a control device to receive an electrical supply voltage, provided by the control device, for supplying the sensor with electrical energy, to receive sync pulses superimposed on the supply voltage for synchronizing a data transmission from the control device, and to transmit data to the control device. The RC low-pass filter generates a reference signal by low-pass filtering an input signal, and to have a first time constant in a first mode and a second time constant in a second mode, wherein the second time constant is shorter than the first time constant. The evaluation unit stabilizes the reference signal by alternately switching the RC low-pass filter into the first mode and into the second mode.

9 Claims, 2 Drawing Sheets

(56) References Cited

OTHER PUBLICATIONS

"Peripheral Sensor Interface for Automotive Applications," PS15 Peripheral Sensor Interface Specification V1.3, 2008, pp. 1-47. <http://www.psi5.org/en/pool/pdf/psi5_specification_v13_080729.pdf> Downloaded Jul. 29, 2022.

DSI, "DSI3 Bus Standard," Revision 1.00, 2011, pp. 1-45. <https://www.dsiconsortium.org/downloads/DSI3_%20Bus_Standard_rl.00.pdf> Downloaded Jul. 29, 2022.

* cited by examiner

SENSOR AND SENSOR NETWORK

FIELD

The present invention relates to a sensor, and to a sensor network including a sensor of this kind.

BACKGROUND INFORMATION

External sensors that are connected to a central control device via a predefined interface, in particular a two-wire interface, are available from the related art. For example the PSI standard, in particular the PSI5 standard, and the DSI standard are known as interfaces of this kind. The control device in a combination of this kind provides the external sensors with a supply voltage via this interface; in addition, data communication from the sensors to the control device takes place via this interface.

In addition to an asynchronous mode, a synchronous mode is also specified for the above-mentioned standards, this synchronous mode being applied if a plurality of external sensors are connected to the control device via the same two-wire line. To synchronize respective data transmissions, the control device transmits sync pulses to the respective sensors via the two-wire interface. The accuracy of determining respective sync points in time that are derived from respective sync pulses is influenced in this case by factors such as component tolerances, junction temperatures, fluctuations in the supply voltage and/or a regulated voltage derived from the supply voltage and/or a frequency and/or a duration of the sync pulses and/or a voltage drop during a data transmission etc. In particular in the case of high data transmission rates it is necessary for the sync points in time to be determined with great accuracy in the sensors in order to make stable data communication with the control device possible.

SUMMARY

According to a first aspect of the present invention, a sensor, in particular an external sensor, that has a switchable RC low-pass filter, an evaluation unit, a synchronization unit, and a two-wire interface is provided. The evaluation unit and/or the synchronization unit is/are, for example, each configured as integrated or as discrete circuits. The evaluation unit and/or the synchronization unit in this case are for example configured as an ASIC, FPGA, processor, digital signal processor, microcontroller, or the like. Furthermore, it is possible for the evaluation unit and the synchronization unit to be integrated in one and the same component (e.g., in an ASIC). Advantageously, the evaluation unit and/or the synchronization unit is/are components of a transceiver module of the two-wire interface of the sensor.

The two-wire interface is set up to be connected to a control device in order to receive an electrical supply voltage, provided by the control device, for supplying the sensor with electrical energy. A supply voltage provided to the sensor in this way is used directly and/or indirectly (e.g. via a voltage regulator) by the sensor. The two-wire interface is further set up to receive sync pulses (short for "synchronization pulses"), superimposed on the supply voltage, for synchronizing a data transmission from the control device, and in a predefined time window, with respect to a sync point in time (short for "synchronization point in time") established by the synchronization unit, to transmit data to the control device, as a result of which data pulses resulting from the data transmission are superimposed on the supply voltage (VSS). These data pulses are preferably current pulses or current signals transmitted via the two-wire interface, without thereby restricting the data pulses to current pulses or current signals.

The switchable RC low-pass filter is set up to generate a reference signal by low-pass filtering an input signal of the RC low-pass filter, with a waveform of the input signal corresponding with a waveform of the supply voltage that is superimposed. The input signal of the RC low-pass filter preferably corresponds to a current signal that is derived from the supply voltage. Further, it is possible for the input signal of the RC low-pass filter to correspond to the unchanged supply voltage. Furthermore, it is also possible for the input signal to correspond to voltage signals or current signals that have an offset and/or scaling with respect to the supply voltage. The switchable RC low-pass filter is furthermore set up to have a first time constant in a first mode of the RC low-pass filter and to have a second time constant in a second mode of the RC low-pass filter, the second time constant being shorter than the first time constant.

The evaluation unit is set up to stabilize the reference signal by switching the RC low-pass filter into the first mode at least when a sync pulse or data is/are superimposed on the supply voltage, and by switching the RC low-pass filter into the second mode at least in a period between two sync pulses (i.e. periods in which there are no sync pulses) in which no data are superimposed on the supply voltage. Respective switching points in time for switching between the first mode and the second mode are predefined points in time (i.e., relative points in time in relation to respective sync points in time) stored for example in a memory unit connected for information transfer to the evaluation unit, and/or points in time that at runtime are derived from the signal waveform of the supply voltage and/or from the input signal that corresponds with the supply voltage.

Finally, the synchronization unit is set up to form a difference signal from the input signal and the reference signal and to determine a sync point in time whenever the difference signal exceeds a predefined threshold value (i.e., a detection threshold of the sync pulse, which corresponds for example to half a pulse amplitude). A sync point in time determined in this way can then be used for synchronizing or establishing a transmission point in time of a data transmission from the sensor to the control device.

The above configuration of the sensor according to the present invention may yield in particular the advantage that a reference signal generated in this way, at least in those periods in which sync pulses are received in the sensor, has a signal value that corresponds substantially with the non-superimposed supply voltage. This reduces or avoids time-related deviations ("jitter") when determining the sync points in time, since any exceeding of the threshold value when a sync pulse arrives is determined substantially always at the same position with respect to the waveform of the sync pulse. In a reference signal, used in the related art, for determining the respective sync points in time, on the other hand, greater or lesser deviations of the sync points in time may occur, since the reference signal owing to a low-pass filtering used in the prior art with a fixed time constant at least in periods of incoming sync pulses may possibly deviate from the non-superimposed input signal (which corresponds to the supply voltage with sync pulses or data not superimposed). In addition, the sensor according to the present invention offers the advantage that substantially jitter-free determination of respective sync points in time in the sensor takes place independently of a data transmission rate established for the two-wire interface.

The sensor according to the present invention thus offers greater flexibility with regard to usability in different configurations with different data transmission rates, in particular high data transmission rates, and/or with different frequencies and/or durations of the sync pulses and/or with a different current range of sensors. It should generally be pointed out that the sensor and the two-wire interface are preferably set up to be operated in bus operation in combination with further sensors, with the sensors being connected for example in parallel or in series to a shared bus.

Preferred developments of the present invention are disclosed herein.

According to an example embodiment of the present invention, preferably the two-wire interface implements a PSI protocol, in particular a PSI5 protocol, or a DSI protocol. It should be pointed out that the sensor according to the present invention can also advantageously be used in conjunction with a differing two-wire interface, as long as differing two-wire interfaces likewise have a power supply to the sensor via a control device connected using the two-wire interface, and as long as respective sync points in time require a stabilized reference signal for a data transmission via the two-wire interface.

According to an example embodiment of the present invention, preferably the two-wire interface is set up to be operated in a synchronous transmission mode in order to enable for example bus operation with a plurality of external sensors connected to the two-wire interface.

According to an example embodiment of the present invention, advantageously, the RC low-pass filter upon a transition from a de-energized state of the sensor into an energized state is in the first mode. This enables the reference signal, during a starting phase of the sensor, to largely approximate the non-superimposed supply voltage without being influenced by any interference that may be present during the starting phase. Activating the sensor in the second mode, on the other hand, would result in the reference signal following very rapidly on the input signal, possibly also in those periods in which interference and/or sync pulses etc. is/are present, as a result of which it may not be possible to achieve a stable starting basis for generating the reference voltage.

According to an example embodiment of the present invention, particularly advantageously, the second time constant is established in such a way that the reference signal, in a period in which the RC low-pass filter is operated in the second mode, is fitted to the input signal up to a predefined maximum deviation. Preferably the time constant is established in such a way that the predefined maximum deviation corresponds to a value of zero or a value close to zero, so that the deviation between the reference signal and the input signal is minimized. Depending on a data transmission rate used and/or a data transmission period of the sensor and/or tolerance ranges defined with respect to the two-wire interface, it is also possible to use predefined maximum deviations that are greater than zero. In particular in a case in which the evaluation unit between two successive sync pulses changes several times between the first mode and the second mode, it is possible to allow a relatively large maximum deviation when selecting the time constant, since in this way several periods between the two sync pulses can be utilized in order to fit the reference signal in succession to the non-superimposed input signal.

In one advantageous configuration of the sensor according to the present invention, the sensor further comprises a switch, in particular an electronic switch such as a transistor etc., the RC low-pass filter including a first resistor that is electrically connected to a capacitor of the RC low-pass filter, with a series connection formed of a second resistor and the switch being connected in parallel to the first resistor, and with the evaluation unit being set up, by actuation of the switch, to activate the first mode of the RC low-pass filter by opening the switch, and to activate the second mode of the RC low-pass filter by closing the switch. To this end, a control input of the switch is electrically connected to a data output of the evaluation unit.

Preferably the evaluation unit is set up to activate the second mode in at least one of the following periods, in which neither sync pulses nor data is/are superimposed on the supply voltage: immediately prior to and/or after a respective sync pulse, and/or between respective data transmission periods between two sync pulses, and/or during a data transmission period, in the event that at least in part no data transmission takes place therein, or an existing data transmission at this point in time does not effect superimposition of the supply voltage.

According to a second aspect of the present invention, a sensor network is proposed that comprises at least two sensors according to one of the example embodiments and a control device, the control device being electrically connected to the at least two sensors via the two-wire interface, and being set up, using the two-wire interface, to supply the sensors with a supply voltage, and to receive data from the at least two sensors.

Preferably, respective points in time for activating respective first modes of respective RC low-pass filters of the respective sensors dependent on respective sensor-specific data transmission periods of the respective sensors are established. In this way, the respective sensors, for the stabilization according to the present invention of the reference signal, do not require any knowledge of data transmission periods of further sensors following their own data transmission period if for example each sensor of the sensor network briefly switches into the second mode of the low-pass filter immediately prior to and/or after its own data transmission period.

It should be generally pointed out that, instead of by using an RC low-pass filter with a switchable time constant, the reference signal can alternatively or additionally also be stabilized in that a switchable or non-switchable RC low-pass filter is preceded by a second switch that, after an initial activation phase of the sensor in which the input signal is initially applied to the RC low-pass filter, only connects the RC low-pass filter to the input signal if the supply voltage is not superimposed either with a sync pulse or with data.

BRIEF DESCRIPTION OF THE DRAWINGS

Below, example embodiments of the present invention will be described in detail with reference to the figures.

DETAILED DESCRIPTION OF EXAMPLE EMBODIMENTS

Figure 1:
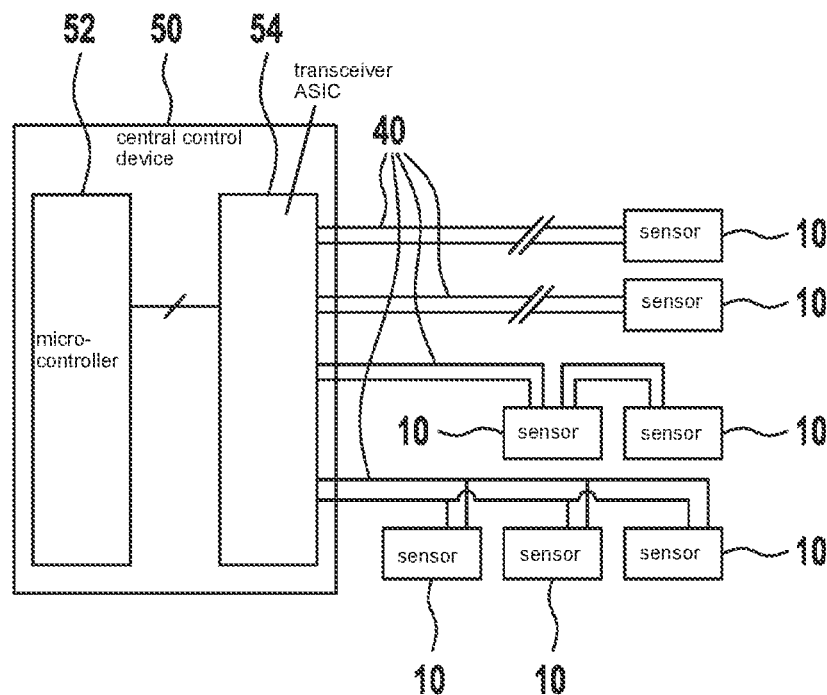
FIG. 1 is a schematic overview of components of a sensor network according to an example embodiment of the present invention.

FIG. 1 shows a schematic overview of components of a sensor network 100 according to the present invention that here uses the PSI5 interface 40 and here is a sensor network 100 of a means of transport. The means of transport is for example a road vehicle (for example motorcycle, automobile, transporter, truck) or a rail vehicle or an aircraft/airplane and/or a water-borne vehicle. The sensor network 100 comprises a plurality of sensors 10 that are connected by way of example in different configurations (inter alia in the form of serial and parallel bus configurations) to a central control device 50 of the sensor network 100 using the PSI5 interface 40. The control device 50 has a transceiver ASIC 54 that implements the protocol of the PSI5 interface. A microcontroller 52 of the control device 50, that is coupled for information transfer to the transceiver ASIC 54, processes inter alia the data received from the sensors 10 and makes it available in the means of transport.

Figure 2:
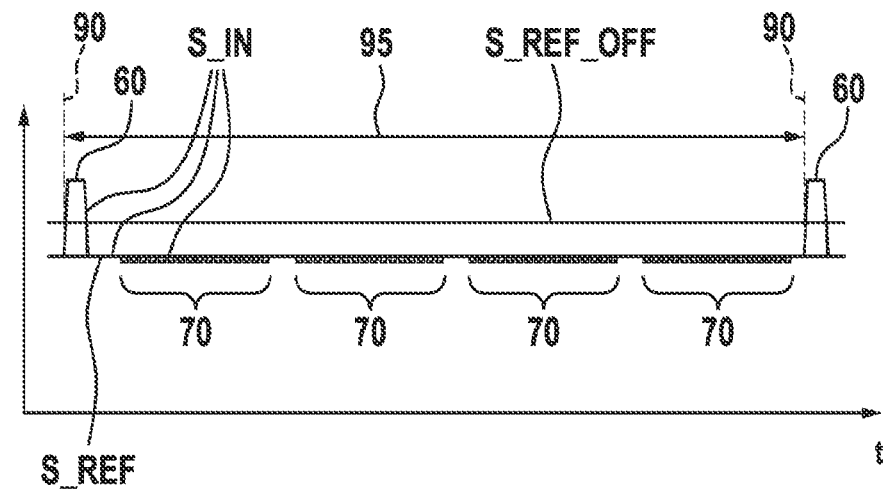
FIG. 2 is an overview of idealized signal waveforms in a sensor according to an example embodiment of the present invention.

FIG. 2 shows an overview of idealized signal waveforms in a sensor 10 according to the present invention. What is shown is a period between two sync pulses 60 of a PSI5 interface 40 that corresponds to a sync interval 95. An input signal S_IN corresponding with a supply voltage VSS comprises the sync pulses 60 of the PSI5 interface 40 and a plurality of data transmission periods 70 that are utilized by four sensors 10 that are operated in a synchronous mode on one and the same bus of the PSI5 interface 40. A reference signal S_REF that corresponds to ideal smoothing of the input signal S_IN here accordingly has a constant waveform corresponding with a value of the supply voltage VSS that is not superimposed with sync pulses 60 or data 80. Accordingly, an offset signal S_REF_OFF that is formed from superimposition of the reference signal S_REF with a predefined threshold value (i.e. a switching threshold for detecting a sync point in time) likewise has a constant waveform. A difference signal from the input signal S_IN and the offset signal S_REF_OFF therefore has a sign change at always identical points in time with respect to the start of the respective edges of the sync pulses 60. This point in time corresponds to the respective sync points in time 90 derived from the sync pulses 60, which sync points in time are used for synchronizing the data transmissions succeeding the sync pulses 60. The determination described here of the respective sync points in time 90 represents a possible implementation of determination according to the present invention of the respective sync points in time 90 on the basis of the comparison of the difference signal from the input signal S_IN and the reference signal S_REF with the predefined threshold value.

Figure 3:
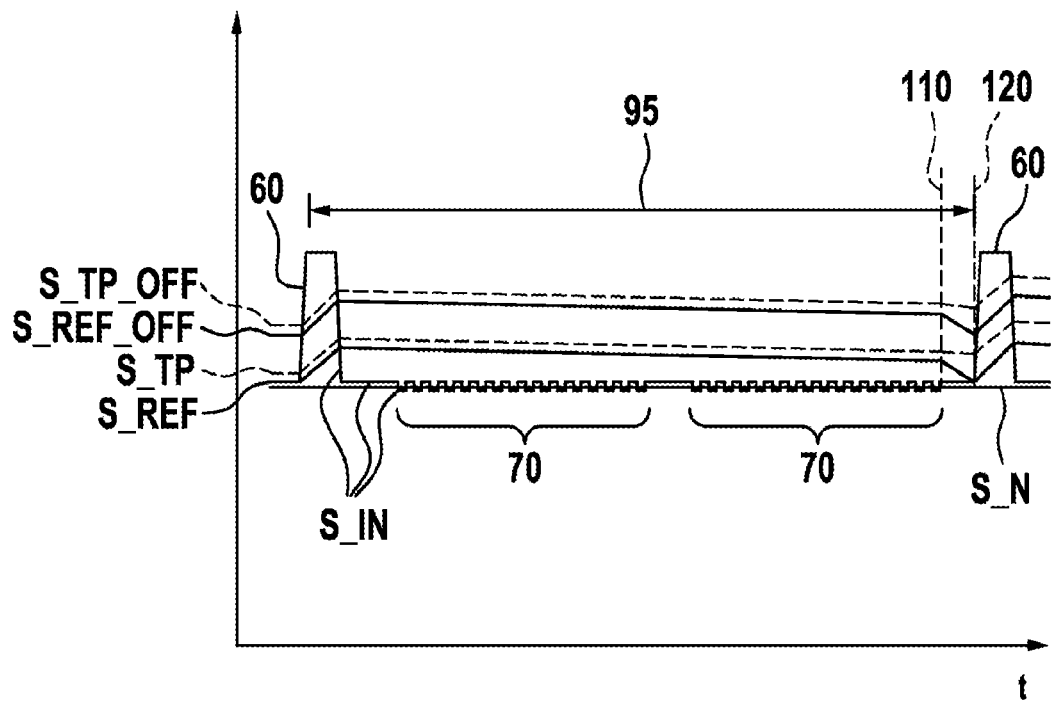
FIG. 3 is an overview of real signal waveforms in a sensor according to the an example embodiment of the present invention.

FIG. 3 shows an overview of real signal waveforms in a sensor 10 according to the present invention. In order to avoid repetition, only the differences between FIG. 3 and FIG. 2 will be discussed below. At the PSI5 interface 40, here only two sensors 10 instead of four are operated, which is why correspondingly only two data transmission periods 70 are present compared with FIG. 2. The waveform of the supply voltage VSS or of the input voltage S_IN corresponding therewith corresponds substantially to that in FIG. 2. A result of filtering the input signal S_IN using a non-switchable RC low-pass filter used in the prior art is shown for comparison purposes in the form of a signal S_TP.

It is shown that the signal S_TP through the incoming sync pulse 60 rises over the duration of the sync pulse 60. Once the sync pulse 60 has ceased, the signal S_TP slowly falls, but when the subsequent sync pulse 60 arrives does not attain the same signal value as was present when the preceding sync pulse 60 arrived due to the selected time constant of the RC low-pass filter. An offset signal S_TP_OFF on the basis of the signal S_TP, formed analogously to the description in FIG. 2, accordingly follows the waveform of the signal S_TP. Determination of respective sync points in time 90 by considering the difference from the input signal S_IN and the offset signal S_TP_OFF thus results in the time intervals between respective edges of the sync pulses 60 and the sync points in time 90 determined in this way over time deviating from respective set sync points in time when a non-switchable low-pass filter is used. This may lead to interference and/or interruptions in data transmissions between the respective sensors 10 and the control device 50.

By using a switchable low-pass filter 20 according to the present invention, a reference signal S_REF is generated from the input signal S_IN that, prior to the arrival of a respective sync pulse 60, is fitted to a value of the input signal S_IN that the input signal assumes at points in time at which neither sync pulses nor data transmissions are superimposed on the input signal S_IN. This is achieved for example by switching the RC low-pass filter 20 into the second mode (i.e. the mode having the shorter time constant) at a point in time 110 and by switching the RC low-pass filter 20 into the first mode (i.e. the mode having the longer time constant) at a point in time 120.

An offset signal S_REF_OFF that is generated on the basis of the reference signal S_REF and is then used for alignment with the input signal S_IN to determine respective sync points in time 90 enables sync points in time 90 to be determined at approximately uniform time intervals in relation to respective edges of the respective sync pulses 60. A data communication between the sensor 10 and the control device 50 carried out on the basis of sync points in time 90 that are thus determined is accordingly stable or reliable.

It should be pointed out that the input signal S_IN may additionally have an interference signal S_N superimposed on it that for example comprises interference that is interspersed into the PSI5 interface 40. Furthermore, the interference signal S_N may also represent shifts in the supply voltage VSS that may for example be produced by voltage drops during the data transmission periods 70. The influences of an interference signal S_N of this kind are likewise largely compensated using the sensor 10 according to the present invention, so that their influence on stable data communication is minimized or eliminated.

Figure 4:
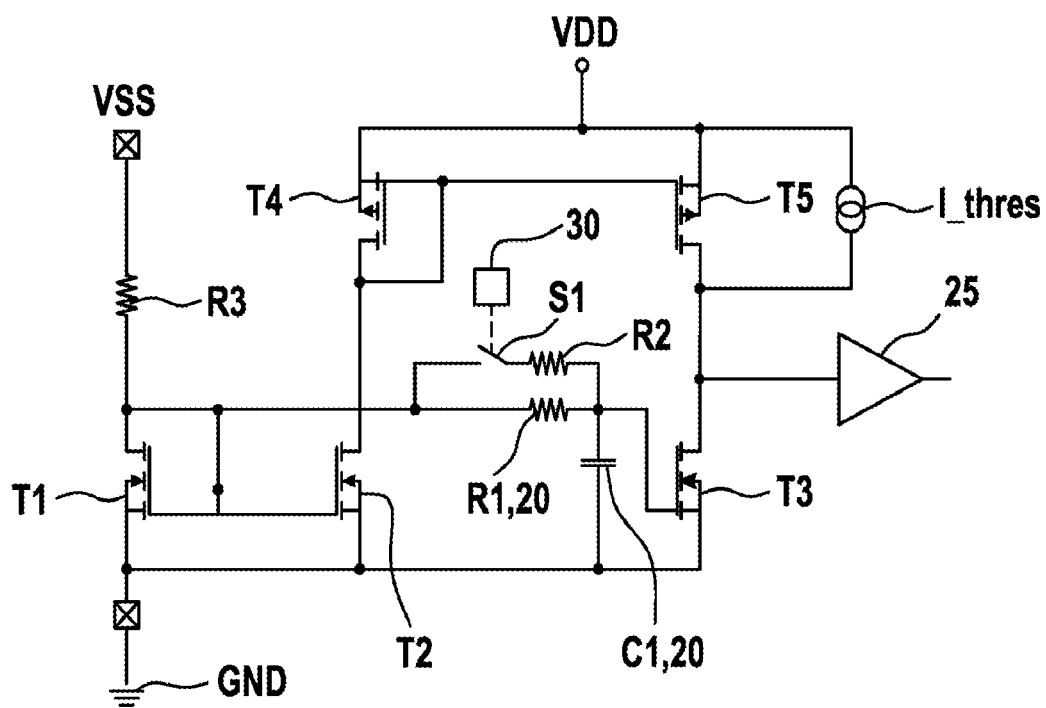
FIG. 4 is an exemplified circuit for determining sync points in time in a sensor according to an example embodiment of the present invention.

FIG. 4 shows an exemplified circuit for determining sync points in time 90 in a sensor 10 according to the present invention. A supply voltage VSS transmitted to the sensor 10 by a control device 50 via a PSI5 interface 40 is converted into a current waveform using a third resistor R3 and is supplied to a first transistor T1 that operates as a reference transistor of a current mirror. Power is supplied to the circuit via a voltage regulator that is fed using the supply voltage VSS and outputs a regulated voltage VDD to the circuit. A second transistor T2 and a third transistor T3 operate as decoupling transistors of the current mirror, with the transistor T2 at the drain terminal carrying the same current as the transistor T1 (with the same W/L), i.e. a current that represents an input signal S_IN, the waveform of which corresponds with a waveform of the supply voltage VSS (including sync pulses and data).

Due to an RC low-pass filter 20, consisting of a first resistor R1 and a capacitor C1, the third transistor T3 at the drain terminal on the other hand has a current that represents a reference signal S_REF that due to filtering using the RC low-pass filter 20 corresponds to a smoothed signal waveform of the input signal S_IN. The drain current of the second transistor T2 is mirrored onto the drain of the third transistor T3 using a p-channel current mirror, consisting of a fourth transistor T4 and a fifth transistor T5. As a result, a drain current difference of the second transistor T2 and the third transistor T3 is formed at a voltage level (high or low) that is passed on, amplified by a buffer 25, to an evaluation circuit located in the sensor 10. To set a switching threshold (i.e. a detection threshold for the sync points in time 90), a switching-threshold current I_thres is impressed at the drain of the third transistor T3 or of the fifth transistor T5.

Components mentioned above that form the difference between the input signal S_IN and the reference signal S_REF and compare this difference with the switching threshold and thus determine the sync points in time form a synchronization unit of the circuit. A series connection formed of an electronic switch S1 and a second resistor R2 is additionally connected in parallel to the resistor R1, so that, dependent on a position of the switch S1, a resistance of the RC low-pass filter 20 and hence a time constant of the RC low-pass filter 20 can be changed. A control input of the switch S1 is electrically connected to an evaluation unit 30 that is set up to open the switch S1 at least when the supply voltage VSS has a sync pulse 60 or data 80 superimposed on it, and to close the switch at least in a period between two sync pulses 60 in which no data 80 are superimposed on the supply voltage VSS. In addition, a reference potential GND of the circuit is illustrated in the circuit.

What is claimed is:

1. A sensor, comprising:
    a switchable RC low-pass filter;
    an evaluation unit;
    a synchronization unit; and
    a two-wire interface;
    wherein the two-wire interface is configured:
        to be connected to a control device to receive an electrical supply voltage, provided by the control device, for supplying the sensor with electrical energy,
        to receive sync pulses superimposed on the supply voltage for synchronizing a data transmission from the control device, and
        in a predefined time window, with respect to a sync point in time established by the synchronization unit, to transmit data to the control device, as a result of which data pulses resulting from the data transmission are superimposed on the supply voltage;
    wherein the switchable RC low-pass filter is configured:
        to generate a reference signal by low-pass filtering an input signal of the RC low-pass filter, wherein a waveform of the input signal corresponds with a waveform of the supply voltage that is superimposed,
        to have a first time constant in a first mode of the RC low-pass filter, and
        to have a second time constant in a second mode of the RC low-pass filter, wherein the second time constant is shorter than the first time constant;
    wherein the evaluation unit is configured to stabilize the reference signal by:
        switching the RC low-pass filter into the first mode at least when a sync pulse or data is superimposed on the supply voltage, and
        switching the RC low-pass filter into the second mode at least in a period between two sync pulses in which no data are superimposed on the supply voltage; and
    wherein the synchronization unit is configured:
        to form a difference signal from the input signal and the reference signal, and
        to determine a sync point in time whenever the difference signal exceeds a predefined threshold value.

2. The sensor as recited in claim 1, wherein the two-wire interface implements a PSI protocol, or a DSI protocol.

3. The sensor as recited in claim 1, wherein the two-wire interface can be operated in a synchronous transmission mode.

4. The sensor as recited in claim 1, wherein the RC low-pass filter, upon a transition from a de-energized state of the sensor into an energized state, is in the first mode.

5. The sensor as recited in claim 1, wherein the second time constant is established in such a way that the reference signal, in a period in which the RC low-pass filter is operated in the second mode, is fitted to the input signal up to a predefined maximum deviation.

6. The sensor as recited in claim 1, further comprising an electronic switch;
    wherein:
        the RC low-pass filter includes a first resistor that is electrically connected to a capacitor of the RC low-pass filter,
        a series connection formed of a second resistor and the switch is connected in parallel to the first resistor, and
        the evaluation unit is configured to, by activation of the switch:
            activate the first mode of the RC low-pass filter by opening the switch,
            to activate the second mode of the RC low-pass filter by closing the switch.

7. The sensor as recited in claim 1, wherein the evaluation unit is configured to activate the second mode in at least one of the following periods, in which neither sync pulses nor data are superimposed on the supply voltage:
    immediately prior to and/or after a respective sync pulse (60), and/or
    between respective data transmission periods (70) between two sync pulses, and/or
    during a data transmission period, in the event that, at least in part, no data transmission takes place therein, or an existing data transmission at this point in time does not effect superimposition of the supply voltage.

8. A sensor network, comprising:
    at least two sensors, each of the sensors including:
        a switchable RC low-pass filter;
        an evaluation unit;
        a synchronization unit; and
        a two-wire interface;
        wherein the two-wire interface is configured:
            to be connected to a control device to receive an electrical supply voltage, provided by the control device, for supplying the sensor with electrical energy,
            to receive sync pulses superimposed on the supply voltage for synchronizing a data transmission from the control device, and in a predefined time window, with respect to a sync point in time established by the synchronization unit, to transmit data to the control device, as a result of which data pulses resulting from the data transmission are superimposed on the supply voltage;

wherein the switchable RC low-pass filter is configured:
   to generate a reference signal by low-pass filtering an input signal of the RC low-pass filter, wherein a waveform of the input signal corresponds with a waveform of the supply voltage that is superimposed,
   to have a first time constant in a first mode of the RC low-pass filter, and
   to have a second time constant in a second mode of the RC low-pass filter, wherein the second time constant is shorter than the first time constant;

wherein the evaluation unit is configured to stabilize the reference signal by:
   switching the RC low-pass filter into the first mode at least when a sync pulse or data is superimposed on the supply voltage, and
   switching the RC low-pass filter into the second mode at least in a period between two sync pulses in which no data are superimposed on the supply voltage; and wherein the synchronization unit is configured:
   to form a difference signal from the input signal and the reference signal, and
   to determine a sync point in time whenever the difference signal exceeds a predefined threshold value; and the control device electrically connected to the at least two sensors via the two-wire interface, and configured to, using the two-wire interface:
   supply the sensors with the supply voltage, and
   receive data from the at least two sensors.

9. The sensor network as recited in claim 8, wherein respective points in time are established for activating the respective first modes of the respective RC low-pass filters of the respective sensors dependent on respective sensor-specific data transmission periods of the respective sensors.

* * * * *